(12) United States Patent
 Casasanta

(10) Patent No.: US 10,195,912 B2
(45) Date of Patent: Feb. 5, 2019

(54) COUPLING ASSIST SYSTEM FOR A TRACTOR TRAILER

(71) Applicant: Carrier Corporation, Farmington, CT (US)

(72) Inventor: James Casasanta, Auburn, NY (US)

(73) Assignee: CARRIER CORPORATION, Farmington, CT (US)

( * ) Notice: Subject to any disclaimer, the term of this patent is extended or adjusted under 35 U.S.C. 154(b) by 0 days.

(21) Appl. No.: 15/520,545

(22) PCT Filed: Oct. 21, 2015

(86) PCT No.: PCT/US2015/056684
§ 371 (c)(1),
(2) Date: Apr. 20, 2017

(87) PCT Pub. No.: WO2016/065017
PCT Pub. Date: Apr. 28, 2016

(65) Prior Publication Data
US 2017/0313141 A1    Nov. 2, 2017

Related U.S. Application Data

(60) Provisional application No. 62/067,632, filed on Oct. 23, 2014.

(51) Int. Cl.
*G08B 21/00*    (2006.01)
*B60D 1/01*     (2006.01)
*B60D 1/36*     (2006.01)
*B60D 1/62*     (2006.01)

(52) U.S. Cl.
CPC ............ *B60D 1/015* (2013.01); *B60D 1/36* (2013.01); *B60D 1/62* (2013.01)

(58) Field of Classification Search
CPC ............ B60D 1/01; B60D 1/36; B60D 1/62
See application file for complete search history.

(56) References Cited

U.S. PATENT DOCUMENTS

| | | | |
|---|---|---|---|
| 3,657,695 A | 4/1972 | Birmingham | |
| 5,108,123 A | 4/1992 | Rubenzik | |
| 5,574,426 A | 11/1996 | Shisgal et al. | |
| 5,729,194 A | 3/1998 | Spears et al. | |
| 5,861,802 A | 1/1999 | Hungerink et al. | |
| 6,120,052 A | 9/2000 | Capik et al. | |
| 6,592,230 B2 | 7/2003 | Dupay | |

(Continued)

FOREIGN PATENT DOCUMENTS

AU    2004201023 A1    9/2004

OTHER PUBLICATIONS

International Search Report for Written Opinion for application PCT/US2015/056684, dated Jan. 26, 2016, 11 pgs.

*Primary Examiner* — Omeed Alizada
(74) *Attorney, Agent, or Firm* — Cantor Colburn LLP

(57) ABSTRACT

A tractor trailer coupling assist system includes a back-up sensor mountable to one of a rear surface of the tractor and a forward surface of the trailer. The back-up sensor is configured and disposed to determine a position of the tractor relative to the trailer. A driver feedback system is mountable to one of the tractor and the trailer. The driver feedback system is configured and disposed to provide visual feedback corresponding to the position to the driver.

10 Claims, 2 Drawing Sheets

(56) References Cited

U.S. PATENT DOCUMENTS

| | | |
|---|---|---|
| 6,604,592 B2 | 8/2003 | Pietsch et al. |
| 6,827,363 B1 | 12/2004 | Amerson |
| 7,463,137 B2 | 12/2008 | Wishart et al. |
| 8,454,181 B2 | 6/2013 | Salter et al. |
| 8,505,949 B2 | 8/2013 | Temple et al. |
| 2001/0022731 A1* | 9/2001 | Dupay .................. B62D 53/10 362/560 |
| 2001/0052434 A1 | 12/2001 | Ehrlich et al. |
| 2003/0234512 A1 | 12/2003 | Holub |
| 2005/0128060 A1 | 6/2005 | Rennick et al. |
| 2008/0191449 A1 | 8/2008 | Standen |
| 2014/0151979 A1 | 6/2014 | Puckett et al. |

* cited by examiner

COUPLING ASSIST SYSTEM FOR A TRACTOR TRAILER

BACKGROUND OF THE INVENTION

Exemplary embodiments pertain to the art of tractor trailer systems and, more particularly, to a coupling assist system for a tractor trailer.

Aligning a $5^{th}$ wheel of a tractor with a pin on a trailer takes skill. Coupling with too much momentum could result in undesirable vibrations. When coupling with a refrigeration unit, undesirable vibrations could lead to cracks in refrigerant lines or damage to refrigeration components. In addition, occasionally, a misalignment between a tractor and a trailer may occur during a coupling procedure. In such cases, a driver may contact a forward surface of the trailer with a rear surface of the tractor. While often times of little or no consequence, contact between a tractor and a refrigeration unit on the forward surface of the trailer could result in damage to the tractor and/or the trailer that could cause significant down time. Reducing undesirable vibrations and misalignments would decrease fleet downtime. As such, advancements in coupling systems would be well received in the art.

BRIEF DESCRIPTION OF THE INVENTION

Disclosed is a tractor trailer coupling assist system including a back-up sensor mountable to one of a rear surface of the tractor and a forward surface of the trailer. The back-up sensor is configured and disposed to determine a position of the tractor relative to the trailer. A driver feedback system is mountable to one of the tractor and the trailer. The driver feedback system is configured and disposed to provide visual feedback corresponding to the position to the driver.

Also disclosed is a semi-trailer including a frame supporting at least top, bottom, side and front walls that collectively define a storage zone. A plurality of wheels is coupled to the frame. A pin is mounted to the frame. The pin defines a connector to a tractor. A coupling assist system includes a back-up sensor mounted to a forward surface of the front wall. The back-up sensor is configured and disposed to determine a position of the trailer relative to a tractor. A driver feedback system is mounted to the forward surface. The driver feedback system is configured and disposed to provide visual feedback corresponding to the position to the driver.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
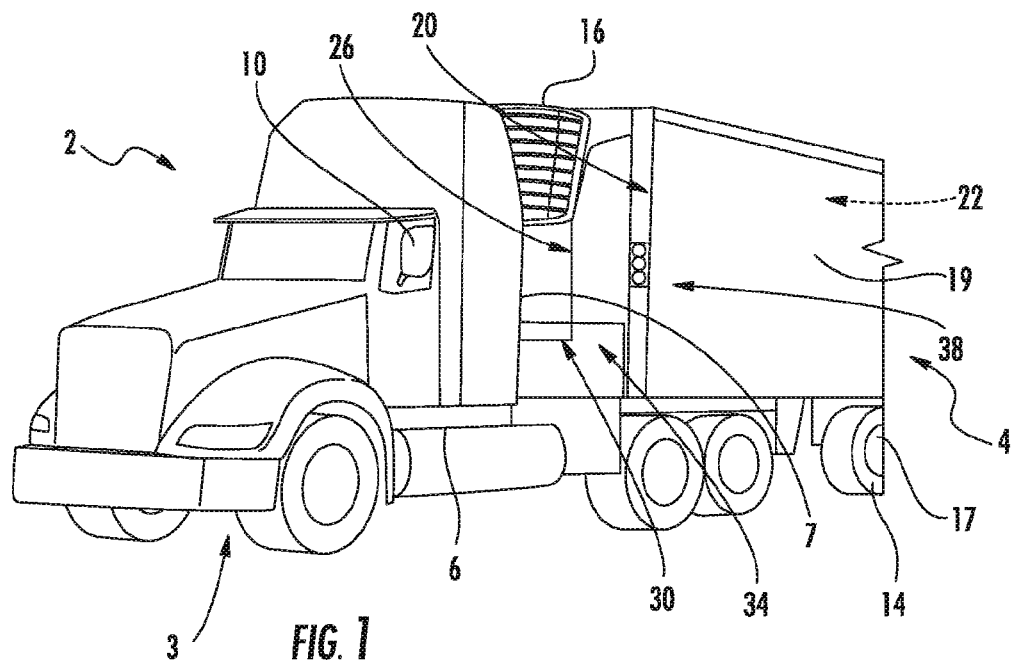
FIG. 1 is partial perspective view of a tractor trailer including a coupling assist system, in accordance with an exemplary embodiment.

A tractor trailer, in accordance with an exemplary embodiment, is shown generally at 2, in FIG. 1. Tractor trailer 2 includes a truck or tractor 3 and a semi-trailer 4. Tractor 3 includes a cab 6 having a rear surface 7 and at least one mirror 10 that provides a driver with a view of, for example, semi-trailer 4. Semi-trailer 4 includes a frame 14 that supports a top wall 16, a bottom wall 17 a first side wall 18, a second side wall 19, and a front wall 20. Top, bottom, first and second side and front walls 16-20 collectively define a storage zone or container 22. Bottom wall 17 includes a pin 23 that connects with a $5^{th}$ wheel (not separately labeled) on tractor 3. Front wall 20 includes a forward surface 24 which, in the exemplary embodiment shown, supports a refrigeration unit 26. Refrigeration unit 26 provides a climate controlled environment in storage zone 22.

Figure 2:
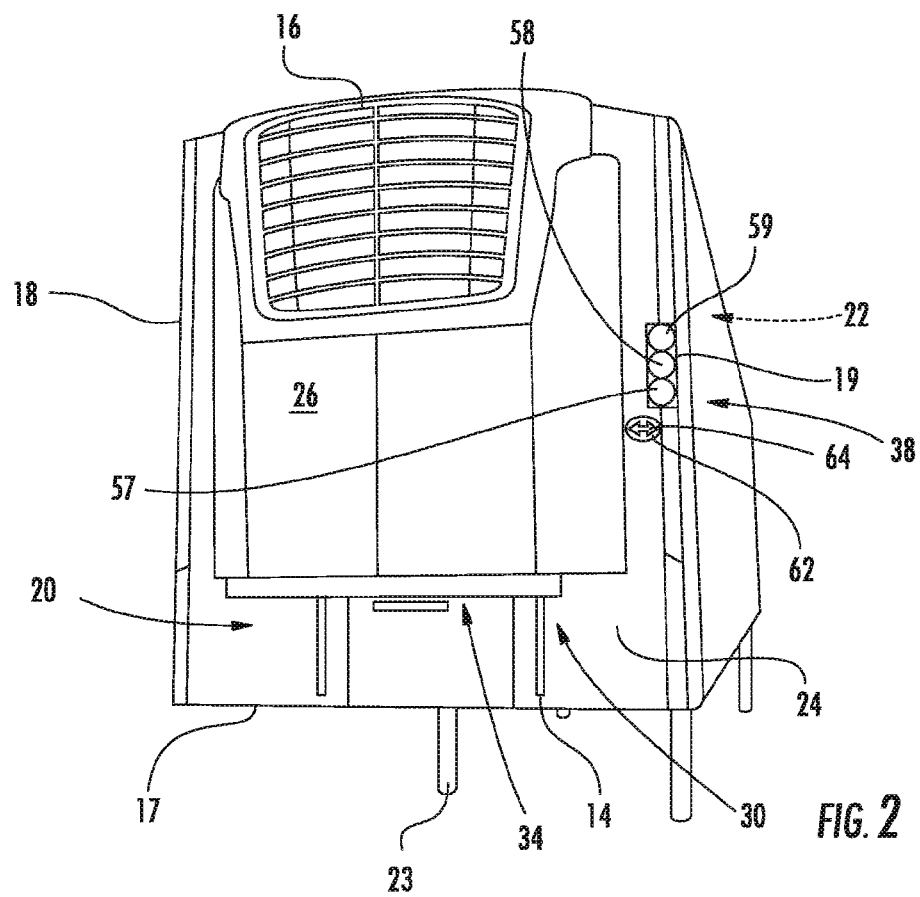
FIG. 2 is a partial perspective view of the trailer of the tractor trailer of FIG. 1 including a coupling assist system, in accordance with an aspect of an exemplary embodiment.
Figure 3:
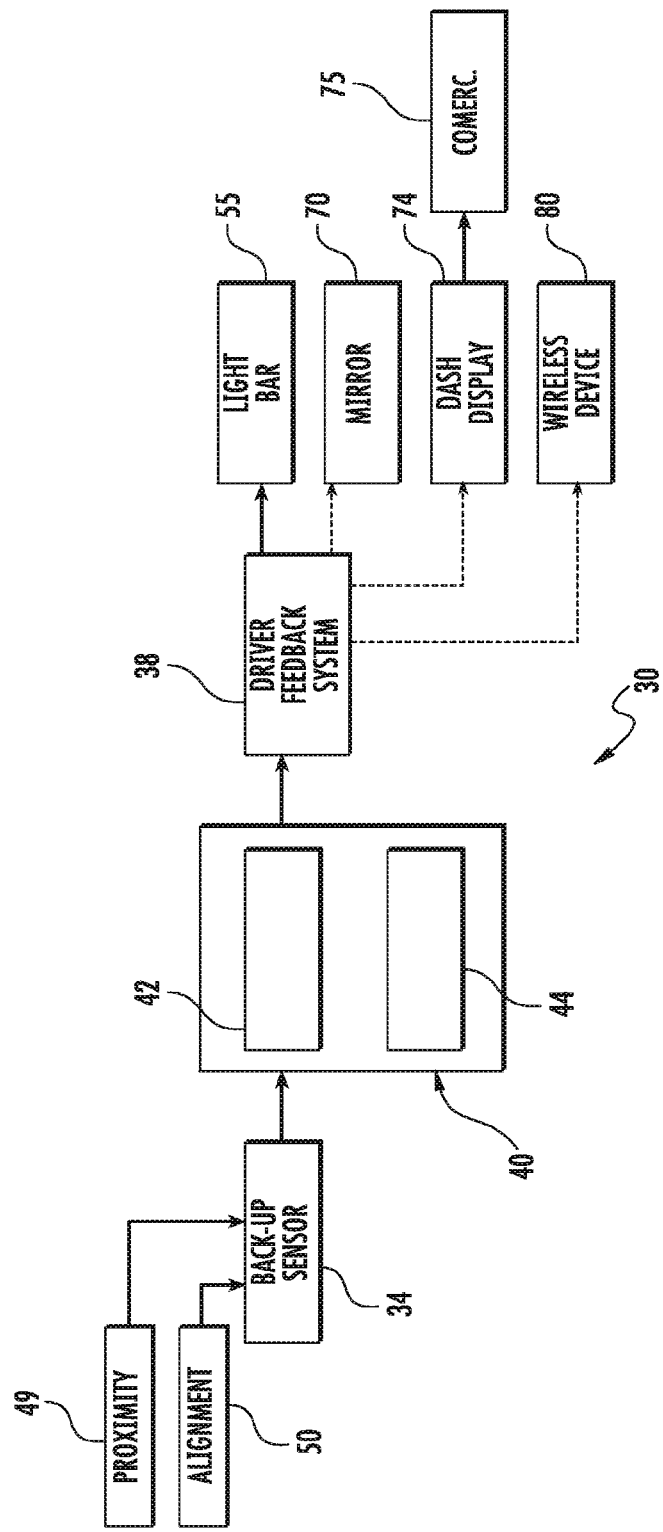
FIG. 3 is a block diagram depicting a coupling assist system, in accordance with another aspect of an exemplary embodiment.

In accordance with an exemplary embodiment, tractor trailer 2 includes a coupling assist system 30 that provides a driver of tractor 3 with guidance when coupling with/connecting to, trailer 4. As shown in FIGS. 2 and 3, coupling assist system 30 includes a back-up sensor 34 and a driver feedback system 38 coupled to a controller 40. Controller 40 may include a central processing unit (CPU) 42 and a communication device 44. Communication device 44 may provide signals to driver feedback system 38 regarding a spatial relationship between tractor 3 and semi-trailer 4. As will be discussed more fully below, communication device 44 may also provide wireless communication signals representing the spatial relationship between tractor 3 and semi-trailer 4.

Back-up sensor 34 may include a proximity sensor 49 that detects a distance between tractor 3 and semi-trailer 4, in particular forward surface 24. Back-up sensor 34 may also include an alignment sensor 50 that tracks a left/right position of the $5^{th}$ wheel relative to pin 23. Back-up sensor 34 provides spatial relationship data to CPU 42 which determines an appropriate output to driver feedback system 38.

In accordance with an exemplary embodiment, driver feedback system 38 may include a light bar 55 mounted to forward surface 24 of semi-trailer 4 in an area visible through, for example, mirror 10. Light bar 55 may include a first light 57, a second light 58 and a third light 59 that provide visual indicators regarding distance between tractor 3 and semi-trailer 4. For example, first light 57 may be a green light, second light 58 may be a yellow light, and third light 59 may be a red light. The green light provides a "go" signal to a driver indicating that a first amount of space exists between tractor 3 and semi-trailer 4. The yellow light provides a "slow" signal to the driver that a second amount of space, that is less than the first amount of space, exists between tractor 3 and semi-trailer 4. The red light provides a driver with a "stop" signal indicating that further movement toward semi-trailer 4 may result in an undesirable contact.

In further accordance with an exemplary embodiment, light bar 55 may include a fourth light 62 that takes the form of left/right arrows 64. Left/right arrows 64 provide the driver with visual feedback that aids in aligning the $5^{th}$ wheel with pin 23. In this manner, coupling assist system 30 not only tracks and guides a driver toward semi-trailer 4 but also provides alignment assistance. In accordance with another aspect of an exemplary embodiment, driver feedback system 38 may present visual indicators to mirror 10 through a mirror output 70 or to a dashboard display 74. Dashboard display 74 may include a camera 75 that provides a real time image of the 5$^{th}$ wheel and pin 23 as well as alignment and distance indicators. Finally, driver feedback system 38 may provide visual feedback in the form of images or icons to a wireless device 80 through communication device 44 provided at controller 40.

At this point, it should be understood that exemplary embodiments describe a system that provides distance and/or alignment feedback to a driver of a tractor when coupling with a semi-trailer. The feedback may take the form of lights, arrows, icons, or real-time video. Also, while described as being mounted to a forward surface of the semi-trailer, the location of the back-up sensor may vary. Also, as discussed above, the feedback system may take on a variety of forms that include tractor and or semi-trailer mounted light bars, real-time video displays, and wireless communication with a mobile electronic device having a driver feedback application (App). The coupling assistance system reduces undesirable contact between a tractor and a trailer. Reducing undesirable contact limits trailer down time, as well as loading/off-loading operations if damage occurs to, for example, an associated refrigeration unit.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A tractor trailer coupling assist system comprising:
   a back-up sensor mountable to one of a rear surface of the tractor and a forward surface of the trailer, the back-up sensor being configured and disposed to determine a position of the tractor relative to the trailer; and
   a driver feedback system mountable to one of the tractor and the trailer, the driver feedback system being configured and disposed to provide visual feedback corresponding to the position to the driver;
   wherein the driver feedback system comprises a light bar mounted to the forward surface of the trailer visible through a rear view mirror;
   wherein the light bar includes at least three indicator lights; and
   wherein the driver feedback system is configured and disposed to provide visual feedback corresponding to distance to the trailer and alignment between the tractor and the trailer.

2. The tractor trailer coupling assist system according to claim 1, wherein the back-up sensor comprises a proximity sensor mounted to the forward surface of the trailer, the proximity sensor being configured and disposed to determine a distance between the tractor and the trailer.

3. The tractor trailer coupling assist system according to claim 1, wherein the driver feedback system provides left/right alignment feedback of a 5$^{th}$ wheel on the tractor with a pin on the trailer.

4. The tractor trailer coupling assist system according to claim 1, further comprising: a communication device linking the back-up sensor and the driver feedback system.

5. A semi-trailer comprising:
   a frame supporting at least top, bottom, side and front walls that collectively define a storage zone;
   a plurality of wheels coupled to the frame;
   a pin mounted to the frame, the pin defining a connector to a tractor; and
   a coupling assist system including:
   a back-up sensor mounted to a forward surface of the front wall, the back-up sensor being configured and disposed to determine a position of the trailer relative to a tractor; and
   a driver feedback system mounted to the forward surface, the driver feedback system being configured and disposed to provide visual feedback corresponding to the position to the driver wherein the driver feedback system comprises a light bar visible through a rear view mirror;
   wherein the light bar includes at least three indicator lights; and
   wherein the driver feedback system is configured and disposed to provide visual feedback corresponding to distance to the trailer and alignment between the tractor and the trailer.

6. The semi-trailer according to claim 5, wherein the back-up sensor comprises a proximity sensor configured and disposed to determine a distance between the tractor and the trailer.

7. The semi-trailer according to claim 5, wherein the driver feedback system provides left/right alignment feedback of a 5" wheel on the tractor with the pin on the trailer.

8. The semi-trailer according to claim 7, wherein the driver feedback system includes a light bar having at least two arrows indicating the alignment between the tractor and the trailer.

9. The semi-trailer according to claim 5, further comprising:
   another driver feedback application incorporated into a mobile communication device; and
   a wireless communication system linking the back-up sensor bar and the another driver feedback application.

10. The semi-trailer according to claim 5, further comprising: a refrigeration unit mounted to the forward surface.

* * * * *